June 24, 1930.    C. A. RICHMOND    1,765,852
SPEED CONTROL APPARATUS FOR RAILWAY CARS
Original Filed July 29, 1916
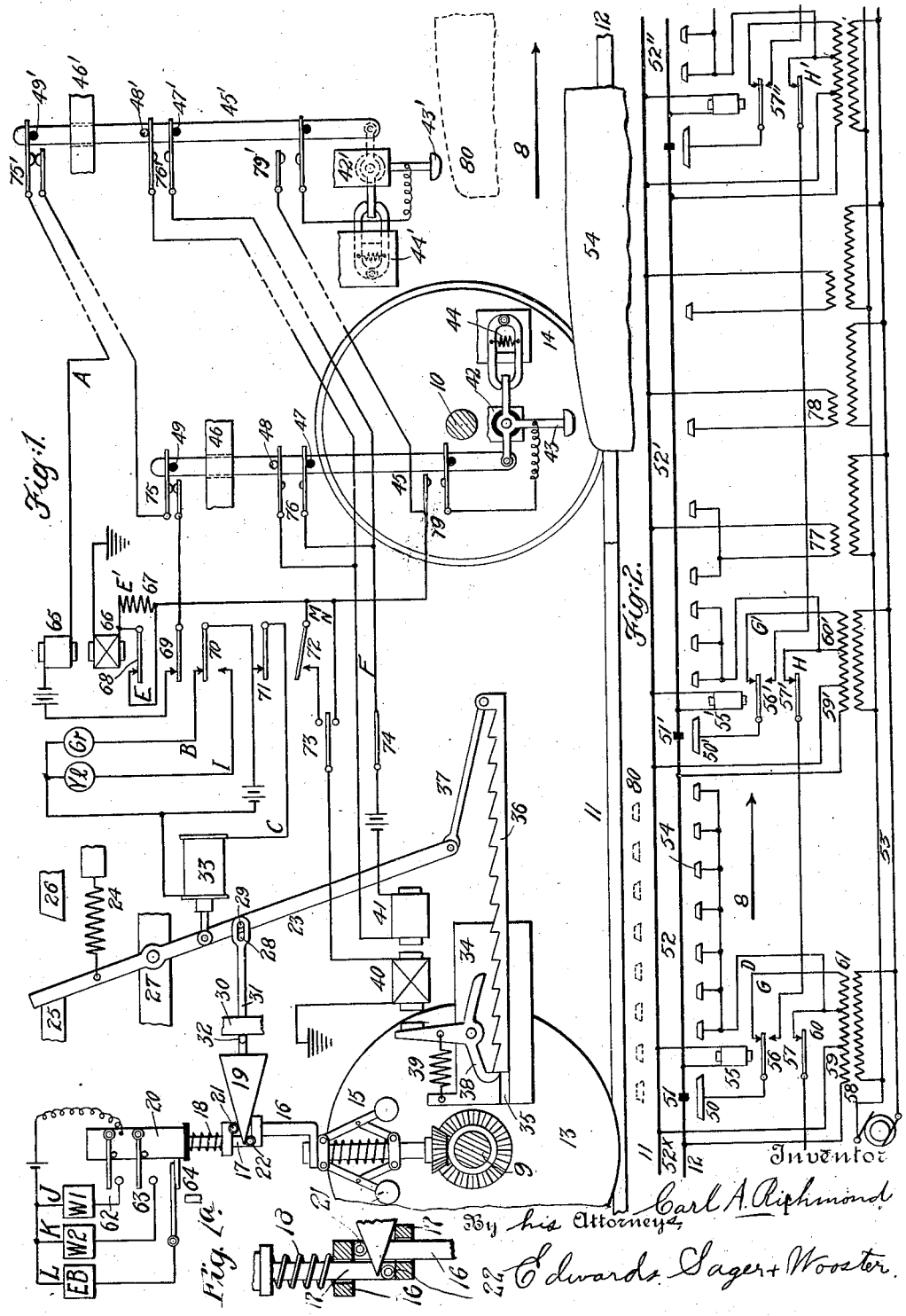

Patented June 24, 1930

1,765,852

UNITED STATES PATENT OFFICE

CARL A. RICHMOND, OF NEW YORK, N. Y., ASSIGNOR TO THE GENERAL RAILWAY SIGNAL COMPANY, A CORPORATION OF NEW YORK

SPEED-CONTROL APPARATUS FOR RAILWAY CARS

Application filed July 29, 1916, Serial No. 111,975. Renewed August 11, 1920. Serial No. 402,860.

The principal object of my invention is to provide new and improved apparatus for a railway car adapted automatically to warn the operator or to check the speed of the car when another car on the same track is approached at an unsafe speed. Another object of my invention is automatically to give warning or to control the speed of a railway car both in accordance with the presence of another car on the track and in accordance with the requirements imposed by permanent track conditions. Still another object of my invention is to initiate control of the car by approach to a car on the track ahead and to continue such control in accordance with the requirements imposed by local track conditions. A further object of my invention is to provide a car with a shoe or shoes and to place two kinds of ramps along the trackway so that any of them may be engaged by said shoes or shoes, and to condition the two kinds of ramps differently so that one kind shall determine whether speed control apparatus on the car shall be set in action, and the other kind of ramps shall serve to operate said speed control apparatus when such operation has been determined by the first kind of ramps. These and other objects of my invention will be made apparent in the following specification and claims taken in connection with the accompanying drawings. In these drawings, I have illustrated a specific embodiment of my invention. The invention is defined in the appended claims, and in exemplification thereof, I now describe the apparatus disclosed in the drawings.

Fig. 1 is a diagram of the car carried parts of this embodiment of my invention.

Fig. 1ª is an enlarged detail partly in section of a part of the apparatus shown in Fig. 1.

Fig. 2 is a diagram of the track apparatus adapted to cooperate with the device of Fig. 1.

11 and 12 are respectively the left and right hand rail heads of a track adapted for one way traffic as indicated by the arrow 8. Fig. 1 shows the rear axle 9 with its left-hand wheel 13 and the front axle 10 with its right-hand wheel 14 for a car on this track. The fly-ball governor 15 driven by bevel gears from the car axle carries the vertical bar 16 which has sliding connection with another bar 17, the spring 18 tending to hold these two bars in elongated relation. The respective bars 16 and 17 carry rollers 21 and 22 engaged by the wedge 19, which acts in opposition to the spring 18. Thus, as the wedge 19 is pushed to the left, it forces the roller 22 downward relatively to the roller 21 (see Fig. 1ª) and thus depresses the bar 17 relatively to the bar 16. The upper bar 17 carries a circuit controlling member 20.

A lever 23 pivoted at 27 is normally held by the energized solenoid 33 against the tension of the spring 24 and its range of movement is limited by the stops 25 and 26. It carries a pin 29 in a slot 28 in the end of the rod 31 connected to the wedge 19. The pin 32 and the stop 30 limit the movement of the wedge 19 to the right, without, however, preventing swinging movement of the wedge 19 and rod 31 up and down about the pin 29.

The rack bar 36 slides in a guide 35 on the support 34 and is connected by a link 37 to the lower end of the lever 23. An escapement dog 38 is held at one extreme by the spring 39 and either magnet 40 or 41 is adapted to rock it to the other extreme.

Even with the front car axle 10 on the support 42 is pivoted a shoe 43 held normally in the position shown by the spring 44. According as the shoe 43 rocks backward or forward, it moves the bar 45 up or down in the guide 46, thus opening or closing certain circuits. There is a similar shoe 43′ on the left side of the car opposite the axle 9; this shoe and its associated parts designated by corresponding numbers with primes are displaced to a part of the figure where they can be clearly shown.

The track rail 11 is continuous but the rail 12 is provided with insulators 51 to form sections or blocks 52. Beside each insulator 51 is a ramp 50. Alternating current mains 53 extend along the side of the track with transformers at convenient places from the secondaries of which conductors are taken as shown in Fig. 2. Within each block 52 ramps 54 are placed. Each track circuit is energized from transformer secondary terminals as 58, 59 and the track relays 55 govern circuit controlling armatures 56 and 57.

Further structural details, especially the arrangement of the circuits, will be brought out in the following discussion of the mode of operation of this embodiment of my invention.

*Case I.*—Assume that the car is proceeding within the block 52 free from control due to any car ahead. The apparatus associated with the track will then be in the condition shown in Fig. 2 and the apparatus on the car will be as shown in Fig. 1. The direct current magnet 65 will be energized, contacts 69, 75 and 75' being closed (circuit A). The energized magnet 65 will hold up its armature 69, thus keeping its own circuit closed at 69, also keeping closed at 70 the circuit of the green lamp $G^r$ (circuit B). Also the magnet 65 will hold up armature 71 keeping the solenoid 33 energized (circuit C), thus holding the lever 23 against the stop 25. Each intermediate ramp 54 is supplied with medium electromotive force from the transformer secondary terminals 59 and 60 (partial circuit D). As the car proceeds, the shoe 43 engages these ramps 54 and is displaced so as to raise the bar 45 closing a circuit at 79 that comprises partial circuit D and supplies alternating current of medium voltage through the armature 68 to the alternating current magnet 66 (partial circuit E).

The medium voltage such as is constantly supplied to the ramps 54 is adequate when applied through partial circuit E to cause alternating current magnet 66 to hold up its armatures, not to pick them up. When the circuit E is open by the dropping of armature 68, medium voltage through the impedance 67 (circuit E') will suffice to make the magnet 66 hold up its armatures but not to pick them up.

At 47 is an insulator stud and at 48 is a hole shown vacant, but adapted to receive the stud 47 if it is desired to transfer it to that position. The raising of the stud 47 closes at 76 a circuit through the direct current magnet 41 (circuit F) which actuates the escapement 38, but since the solenoid 33 remains energized, there is no movement of the rack bar 36. The raising of the stud 49 on the bar 45 opens at 75 the circuit of direct current magnet 65 (circuit A), but its armatures are not dropped because at this time magnet 66 is energized through circuit E. When the shoe 43 drops off from the ramp 54, circuit A closes at 75, E opens at 79, and F opens at 76. Thus the armatures of the magnets 65, 66 are held up all the time and the escapement 38 makes a single idle oscillation. So the progress of the car through the block 52 continues, each ramp 54 producing the inconsequential effects just described.

If the car attains a considerable speed the speed responsive device 15 will depress the member 20, close contacts 62, and actuate warning signal $W^1$ (circuit J). This will signify to the operator that he has attained a proper speed. Further increase of speed will close contacts 63, and actuate warning signal $W^2$ circuit K, which is of different character from $W^1$ and which will signify that the speed is too high and should be reduced. Still further increase of speed will open contacts 64 and release the emergency brake device EB (circuit L) which will apply the emergency brakes.

*Case II.*—Assume that a train proceeding in the manner of Case I is in the block $52^x$ approaching the ramp 50, and suppose that there is no train ahead to exercise any control. The ramp 50 will be supplied with high potential electromotive force from the secondary terminals 59 and 61 (partial circuit G). The effect of the shoe 43 engaging the ramp 50 will be the same as described in Case I for engagement with a ramp 54, until the front wheels 14 pass the insulator 51 and enter the section 52, whereupon they will shunt the track relay 55 which will drop its armatures 56 and 57. The dropping of the armature 56 will reconnect the ramp 50 so that it will thereafter receive medium electromotive force from the transformer secondary terminals 59', 60' (partial circuit H). However, no effect of consequence will be produced, for as already explained, medium electromotive force through partial circuit E in magnet 66 will hold up its armatures. The shoe 43 will leave the ramp 50 as it left the ramp 54 in Case I, and the car will enter block 52 and proceed therein as described in Case I.

*Case III.*—Assume that there is a car ahead in the block 52' and that the car directly considered is in block $52^x$ proceeding toward the ramp 50. The shoe 43 engages the ramp 50, just as in Case II, until the front wheels 14 cross the insulator 51 and enter the section 52. The presence of the train in the block 52' deenergizes the track relay 55' so that its armatures are down and the partial circuit H is open at 57'. Accordingly when the wheels 14 entering the block 52 deenergize the track relay 55 and it drops its armature 56, partial circuit H being open, the ramp 50 receives zero electromotive force. Thereupon the partial circuit E is deenergized and magnet 66 drops its armatures. The dropping of armature 68 opens partial circuit E so that magnet 66 can thereafter be energized only through partial circuit E', which will require high electromotive force. The dropping of armature 69 opens circuit A, which is already open at 75; this puts it in such condition that as the shoe 43 leaves the ramp 50 and closes the contacts 75, the magnet 65 will not pick up. The dropping of armature 70 opens circuit B extinguishing the green light and closes the circuit of the yellow lamp Y¹ (circuit I). Whereas, the green lamp meant to the operator that he was running free from control due to any train ahead, the yellow lamp means that he is subjected to control by a train ahead. The dropping of the armature 71 opens circuit C, deenergizing solenoid 33, so that the spring 24 can throw the lever 23 as the escapement 38 may permit.

While the shoe 43 is on the ramp 50, circuit F will be closed at 76, energizing magnet 41 and thereby holding escapement 38 to the right. Hence, when the solenoid 33 releases, the spring 24 will throw the rack 36 a half notch to the left. When the shoe 43 leaves ramp 50, circuit F will be broken at 76 and spring 39 will return escapement 38 to the left as shown in Fig. 1, and rack 36 will move another half notch to the left, a full notch in all. This movement of rack 36 one notch merely moves pin 29 in slot 28, in readiness so that further movement of rack 36 will be communicated to wedge 19.

As the train proceeds in the block 52, the shoe 43 comes in engagement with the first of the series of ramps 54, energized through partial circuit D with medium electromotive force, which however, is not sufficient through partial circuit E′ to cause magnet 66 to pick-up its armatures. Also the raising of the bar 45 opens the contact 75 in circuit A, but without consequence, for this circuit is already open at 69. The closing of the contacts 76 energizes magnet 41 through circuit F and oscillates the escapement 38 permitting the spring 24 to throw the lever 23 a distance corresponding to one notch on the rack bar 36. As the car proceeds along the block 52, each ramp 54 causes another similar displacement of the lever 23; thus the wedge 19 is thrust gradually between the rollers 21 and 22, lowering the member 20 relatively to the member 16.

Assuming a considerable constant speed for the car and a corresponding condition of the speed responsive device 15, it follows that the lowering of member 20 by advancing wedge 19 will actuate the warning signals W¹ and W² and emergency brake actuator EB in sequence as stated in the latter part of the discussion of Case I.

It will be seen that high speed will cause the fly-ball governor 15 to lower the member 20 and that the advance of the wedge 19 will have the same effect. As the train proceeds in the block 52, the advance of the wedge 19 is superposed in effect on the lowering of the member 20 by the governor 15. The resultant lowering of the member 20 will close the contacts 62 actuating the warning signal W¹. This will mean to the operator that he is getting such speed as he ought to get under the existing circumstances.

If he does not reduce the speed, the member 20 will be depressed a little further by the advancing wedge 19, contacts 63 will close, and the warning signal W² will be actuated. This will mean to the operator that his speed is approaching danger and he should slow down. If he fails to do so, a further advance of the wedge 19 will open the contacts 64 and actuate the emergency brake device EB, producing an automatic stop.

*Case IV.*—Following Case III, assume that the car approaches the ramp 50′ at the end of block 52, and that the car ahead remains in the block 52′. The presence of the car ahead in the block 52′ deenergizes track relay 55′ so that its armature 56′ is down and ramp 50′ is connected to partial circuit H′, which gives either medium or zero electromotive force, according as armature 57″ is up or down, which in turn depends on whether block 52″ is occupied or not. In either case, that is, whether the ramp 50′ has medium or zero electromotive force, the effect will be the same. Medium electromotive force through partial circuit E′ will not cause magnet 66 to pick up its armatures. The operator can wait with the front wheels 14 to the left of the insulator 51′ until the block 52′ clears, whereupon track relay 55′ will pick up and give high electromotive force to ramp 50′ through partial circuit G′. This high electromotive force in partial circuit E′ will cause magnet 66 to pick up its armatures thus re-establishing the green light through circuit B at 70, extinguishing the yellow lamp through circuit I at 70, and energizing the solenoid 33 through circuit C at 71. The energization of solenoid 33 will withdraw the wedge 19 permitting the spring 18 to open wide the contacts 62 and 63 and close the contacts 64. Thereupon the operator can start his front wheels 14 across the insulator 51′ and his further progress will be as described in Case II or Case III.

If, instead of waiting before the insulator 51′, the operator enters the block 52′ before it has cleared, he can proceed therethrough with the lever 23 against the stop 26 enforcing a very slow speed all the way through to the end of the block 52′.

*Case V.*—Following Case III, assume that as the car approaches ramp 50′, the car ahead has departed so that it no longer is within a range to exercise control over the car in question. When the car shoe 43 strikes ramp 50′, it will get high electromotive force from partial circuit G′ to partial circuit E′ and magnet 66 will pick up its armatures. The yellow lamp will be extinguished, the green lamp relighted, and the solenoid 33 energized, which will reset the wedge 19 as shown in Figure 1. Thereafter the progress over the ramp 50′ will be as described in Case II.

*Case VI.*—Following Case III, assume that as the car approaches ramp 50', the car ahead is in section 52''. The armatures of relay 65—66 will pick up as stated in Case V but when the front wheels 14 enter block 52', they will drop again as stated in Case III.

The ramps 54 can be supplied with low electromotive force in multiple in partial circuit D as shown in block 52, or they can be supplied singly as at 78, or in groups as at 77 in block 52'.

Instead of operating the escapement 38 by the direct current magnet 41, the switch 74 may be opened and the switch 73 closed down, thus establishing a partial circuit for alternating current from the shoe 43 through the contacts 79 to the alternating current magnet 40 (partial circuit N). Whenever the shoe 43 strikes an energized ramp 54, the partial circuit N will be energized and the magnet 40 will produce the same effect as heretofore described for the magnet 41.

In case the magnet 40 is relied on and it is desired to prevent idle oscillations of the escapement 38, the switch 73 can be moved up, thus changing the partial circuit N formerly traced so that now it can only be made upon the closure of the armature 72 (partial circuit M). Hence the magnet 40 will only be energized when the control relay 65—66 is deenergized, so as to close the armature 72.

Instead of having the constantly energized ramps 54 on the right-hand side of the track, I can have dead ramps 80 on the left-hand side and depend upon them to actuate the left-hand shoe 43'. In this case the switch 74 must be closed and the switch 73 should be open and the insulator pins 47 and 47' withdrawn from the positions they occupy as shown in Fig. 1 and inserted in the holes 48 and 48'. Thus it will be seen that when the shoe 43' strikes a dead ramp 80, the bar 45' will be lowered. The only effect of this will be to close the contacts 76', which will energize the magnet 41 and oscillate the escapement 38.

The warning signals W¹ and W² or the emergency brake actuator EB may be referred to as a safety appliance for excessive speed. In the embodiment of my invention herein disclosed, it will be seen that I provide only a single kind of shoe and that I provide two kinds of ramps, one kind of ramp such as 54 being adapted to actuate said appliance provided the apparatus is in an appropriate condition, that is, provided the solenoid 33 has been deenergized. Whether the apparatus is in that appropriate condition, that is whether the solenoid 33 shall have been de-energized, depends on the effect received from the other kind of ramp, such as 50. As the car passes such a ramp 50, it is then determined whether or not the apparatus on the car shall be put in a condition to be affected by the succeeding ramps such as 54. The safety appliance for excessive speed is actuated conjointly or additively by the speed responsive device 15 and the distance responsive device 19. Either or both of these devices may be an effective agent for operating the safety appliance for excessive speed. The speed responsive device always determines a limiting maximum speed, and the distance responsive device may be set in action to lower the limit.

The blocks will ordinarily be of different characteristics and the ramps 54 may be disposed accordingly, thus the block 52 is shorter than the block 52', and the closer spacing of the ramps 54 enforces a more abrupt speed reduction.

Comparing shoes 43 and 43' and associated parts, it will be seen that the car can proceed either end foremost on the track with like effect.

I claim:—

1. In combination, a track, a car thereon, a safety appliance for excessive speed on the car, apparatus on the car to actuate said appliance and adapted to change progressively through successive stages, a shoe, a ramp adapted to be engaged by a shoe in passing to determine the presence or absence of a certain condition of said apparatus, and other ramps at the same height and distance from the center of the track as said first mentioned ramp adapted thereafter to be engaged by a shoe in passing and each acting to cause said apparatus to change to the next stage in its progressive change provided an appropriate condition thereof has been determined by said first mentioned ramp.

2. In combination, a track, a car thereon, a safety appliance for excessive speed on the car, apparatus on the car to actuate said appliance, a shoe on the car, a ramp adapted to be engaged by the shoe in passing, and other ramps adapted thereafter to be engaged by the shoe in passing, said other ramps being adapted to operate said apparatus provided it is in a certain condition, said first mentioned ramp being adapted to determine the presence or absence of such condition, and said shoe being adapted to cooperate with all of said ramps.

3. In combination, a track, a car thereon, a safety appliance for excessive speed on the car, apparatus on the car to actuate said appliance, ramps along the track, and shoes adapted to engage said ramps alike when the car proceeds either end foremost on the track, said ramps being of two kinds, one kind being adapted by the engagement of a shoe therewith to determine the presence or absence of a certain condition of said apparatus on the car, and the other kind being adapted thereafter by the engagement of a shoe therewith to operate said apparatus on the car, provided an appropriate condition thereof has been determined by a previous engagement of a shoe with a ramp of the first kind.

4. In combination, a track, a car thereon, a safety appliance for excessive speed on the car, apparatus on the car to actuate said appliance, a shoe, a control relay, ramps to be engaged by a shoe to actuate the control relay, and other ramps to be engaged by a shoe to actuate the apparatus provided the control relay is in a certain appropriate condition, all said ramps being at the same height and the same distance from the center line of the track.

5. In combination, a track, a car thereon, a safety appliance for excessive speed on the car, apparatus on the car to actuate said appliance, a shoe, a series of ramps adapted to be engaged in succession by said shoe, part of said ramps being conditioned in accordance with transient danger conditions along the track, part of them being conditioned in accordance with permanent track conditions, and means on the car adapted to be actuated by the engagement of the shoe with a ramp of the first kind to determine an operative relationship of said apparatus, a subsequent engagement of said shoe with said ramps of the second kind being adapted to operate said apparatus on the car provided the said operative relationship has been established.

6. In combination, a track, a car thereon, a safety appliance for excessive speed on the car, apparatus on the car to actuate said appliance, a shoe, a control relay, a ramp adapted to be engaged by said shoe and when in a certain condition thereby to actuate the control relay, and other ramps in alinement with said first mentioned ramp adapted to be engaged by said shoe to actuate said apparatus provided the control relay has been actuated.

7. In combination, a track, a car thereon, a safety appliance for excessive speed on the car, apparatus on the car to actuate said appliance, a shoe, a control relay, a ramp adapted to be engaged by said shoe to govern said relay in accordance with the condition of said ramp, and other ramps adapted to be engaged by said shoe to actuate said apparatus, the effect of said other ramps being conditioned by said relay.

8. In combination, a track, a car thereon, a safety appliance for excessive speed on the car, apparatus on the car to actuate said appliance, a shoe and associated circuit controllers on one side of the car, a similar shoe and associated circuit controllers on the other side of the car so arranged that the same aspect is presented when the car is viewed from either end, ramps on each side at the same height and equally spaced from the center line of the car, and adapted to be engaged by the respective shoes, the ramps on one side being conditioned by the presence or absence of a train ahead on the track and adapted by the engagement of a shoe therewith to affect the apparatus accordingly, and the ramps on the other side being permanently conditioned and adapted to actuate said apparatus provided it has been affected appropriately by a prior engagement of a shoe with a ramp on the first side.

9. In combination, a track, a car thereon, a safety appliance for excessive speed on the car, apparatus on the car to actuate said appliance, a shoe on each side, corresponding ramps on each side, the shoe on one side by engagement with a ramp on that side being adapted to determine a condition of said apparatus, and the shoe on the other side by engagement with ramps on said other side being adapted to actuate said apparatus provided a favorable condition thereof has been determined, said shoes being equally spaced from the center line of the car.

10. In an automatic train control system for railroads having tracks divided into blocks, impulse devices at separated points along the track in each block and successively encountered by a passing vehicle, automatic train control apparatus on a vehicle including a speed-responsive device governed in accordance with the actual speed of the vehicle, impulse receiving means on the vehicle influenced by said track devices, means governed by said impulse receiving means and changed upon the reception of an impulse to condition the train control apparatus for operation by a succeeding impulse, and means for restoring said last mentioned means to its initial condition at the exit end of each block dependent on traffic conditions in the next block in advance.

11. In an automatic train control system for railroads having tracks divided into blocks, the combination with speed control apparatus on a vehicle including a speed-responsive device driven from the wheels thereof, of means partly on the vehicle and partly on the track for producing controlling impulses on the vehicle at successive points in each block, means responsive to the reception of an impulse for conditioning said apparatus for operation by a succeeding impulse, and means actuated from the track near the end of the block for restoring said apparatus to its initial condition.

12. In an automatic train control system for railroads having tracks divided into blocks, automatic speed control apparatus on a vehicle including a speed-responsive device, a traffic controlled impulse device on the track near the entrance to each block, another impulse device at an intermediate point in each block, impulse receiving means on the vehicle influenced by said track devices, control means on the vehicle responsive to the reception of an impulse at the first track device for placing the speed control apparatus in a condition to be later operated by a succeeding impulse from the second track device, and means effective at the exit end of each block when the next block in advance is not occupied to restore said apparatus to its initial condition.

13. In an automatic train control system for railroads having tracks divided into blocks, automatic train control apparatus on a vehicle including a speed-responsive device, a control relay on the vehicle, means partly on the vehicle and partly along the track for causing said relay to change to an operated condition near the entrance to a block when the next block in advance is occupied, and for actuating said apparatus at a succeeding point in the block provided said control relay is in its operated condition.

14. In an automatic train control system for railroads having tracks divided into blocks, automatic speed control apparatus on a vehicle including a brake setting device and a speed responsive device driven from the wheels of the vehicle, a track impulse device near the entrance to each block and having its controlling condition governed in accordance with traffic conditions in the next block in advance, a similar track impulse device at an intermediate point in each block, impulse receiving means on the vehicle influenced by said track devices, a stick relay on the vehicle deenergized by the cooperation of the impulse receiving means with a track device at the entrance to a block when placed in its stopping condition by the presence of another train in the next block in advance, control means on the vehicle for said speed control apparatus normally held inactive by said stick relay and conditioned for operation by a succeeding impulse when said relay is deenergized, and means for restoring said relay at the exit end of each block when the next block is not occupied.

15. In a train control system, in combination with a trackway divided into blocks each having a track circuit, a brake-setting appliance on a vehicle operable to effect an automatic application of its brakes, apparatus for governing the operation of said appliance including a centrifugal speed responsive device constantly dependent upon the actual speed of the vehicle, said apparatus having a certain condition in which the brake-setting appliance is operated whenever the vehicle exceeds a predetermined restricted speed limit, said apparatus assuming said certain condition only upon the reception of a primary influence followed directly by a secondary influence without an intervening resetting influence, and track circuit controlled means partly on the vehicle and partly on the track for communicating to the vehicle a primary influence near the entrance end of a block if the next block in advance is occupied, a secondary influence at an intermediate point in the same block, and a resetting influence at the exit end of that block provided the next block in advance is not then occupied.

16. A system for regulating speed of railway vehicles over a trackway divided into blocks in the same manner as in block signal systems comprising, vehicle-carried means and cooperating trackway means acting to impart a primary influence to the vehicle at the entrance to each block if the next block in advance is occupied, a secondary influence at an intermediate point in the same block, and a restoring influence at the exit end of the block provided the block next in advance is not then occupied; brake applying means on the vehicle including a centrifugal speed responsive device coupled to the running gear thereof, said brake applying means being operable to a certain speed restricting state and while in that state acting to prescribe a restricted speed limit that the vehicle can not at any time thereafter exceed without an automatic brake application; and control means on the vehicle for governing said brake applying means and comprising a stick relay which has its energization changed by said primary influence, said control means if such change in the energization of said stick relay exists being capable of responding to said secondary influence and thereby place said brake applying means in its speed restricting state, the restoring of said control means and the removal of the restricted speed limit being dependent upon the reception of a restoring influence.

17. A system of train control for railroads provided with the usual blocks, the combination with means partly on the vehicle and partly on the track for communicating to the vehicle near the entrance to each block a primary influence if the block next in advance is occupied, a secondary influence at an intermediate point in the same block, and a resetting influence at the exit end of that block provided the next block in advance is not then occupied; of brake control apparatus on the vehicle responding to said influences and including a speed responsive device operatively connected to the wheels of the vehicle, said apparatus having a certain condition which while effective establishes a restricted speed limit that the vehicle can not exceed at any time without an automatic application of its brakes, said apparatus being rendered thus effective by a secondary influence only if it has been antecedently influenced by a primary influence subsequent to a resetting influence, said apparatus being restored to normal by said resetting influence and thereby made ready to respond again to successive primary and secondary influences.

18. A train control system for railroads having tracks divided into blocks comprising, in combination with trackway means for each block adapted to cooperate with car-carried means and communicate to the car a resetting influence near the entrance to a block prior to the entrance of the car therein provided that block is not then occupied, a primary operating influence thereafter at a further point in the travel of the car in the same block provided the next block in advance is occupied, and a secondary operating influence at an intermediate point in the same block; of car equipment responding to said influences and comprising a brake-setting appliance tending to apply the brakes and electrically maintained inactive, apparatus governing said appliance and including a speed responsive device operatively connected to the car wheels, said apparatus acting upon the reception of successive operating influences in the same block next in the rear of an occupied block to establish a speed limit that the car can not exceed without a brake application, said equipment being restored to normal by a resetting influence to discontinue such speed limit.

19. A system for regulating the speed of railway vehicles comprising, in combination with a trackway divided into blocks each provided with a track circuit, a track device near the entrance to each block and another track device at an intermediate point in the same block, a circuit controller on the vehicle actuated by cooperation with said track devices, brake control apparatus on the vehicle including a centrifugal speed responsive device operatively connected to the wheels of the vehicle, said apparatus being adapted to be placed in a certain condition during which the brakes are automatically applied if the vehicle at any time exceeds a predetermined restricted speed limit, said apparatus assuming said certain condition only after said circuit controller has been actuated by said track devices successively without the reception of an intervening resetting influence, said apparatus being restored to normal upon the reception of a resetting influence, a trackway circuit associated with each block and if closed and energized providing a resetting influence at the exit end of that block, and means for opening said circuit of each block if the next block in advance is occupied.

20. In a train control system for railroads having tracks divided into blocks as in block signal systems, the combination with brake control apparatus on a vehicle including a speed responsive device driven from the wheels thereof and changeable to prescribe a restricted speed limit that the vehicle can not exceed without an automatic brake application, said apparatus when changed to prescribe such speed limit remaining in that condition until restored; of control means partly on the vehicle and partly on the track determining the change and restoration of said apparatus, said control means comprising two electro-responsive devices on the vehicle and causing said apparatus to prescribe such a speed limit only after change in the energization of both of said devices followed by a repeated change in the energization of one of said devices, such change in the energization of both devices occurring at the entrance to a block whenever the next block in advance is occupied and the repeated change in the energization of said one device occurring at an intermediate point in the same block, said control means changing said apparatus back to normal and discontinuing said speed limit at the exit end of a block provided the next block in advance is not then occupied.

21. In a speed control system for railroads divided into blocks as in block signal systems, the combination with car equipment comprising, a circuit controller, and speed governed brake control means rendered effective only after successive operations of said circuit controller to prescribe a continuing restricted speed limit that the car can not exceed without an automatic brake application; of trackway means for causing such successive operation of said circuit controller at successive points in each block if the next block in advance is occupied, and means for causing restoration of said brake control means to normal at the exit end of each block provided the block next in advance is not then occupied.

22. In a train control system, the combination with car equipment comprising a brake-setting appliance, apparatus for governing said appliance including a speed responsive device driven from the car wheels and for causing when active an automatic brake application if the actual speed of the car exceeds a predetermined restricted speed limit, means including a stick relay normally acting to maintain said apparatus inactive, other means also normally maintaining said apparatus inactive and operable by an impulse from the trackway, and a signal indicating the condition of said stick relay; of cooperating means on the car and on the trackway for first changing the stick relay from normal near the entrance to a block if the next block in advance is occupied and for thereafter at an intermediate point in the same black operating said other maintaining means, and trackway means acting at the exit end of a block to restore the stick relay to normal if the next block in advance is not then occupied.

23. In a train control system, the combination with a car and a track therefor divided into blocks, trackway impulse devices at successive points in each block, brake control apparatus on the car including a speed responsive device driven from the car wheels and controllable to establish a restricted speed limit that the car can not exceed without an automatic brake application, said apparatus including a signal governed by the speed responsive device and changed if the actual speed of the car is nearly as high as said restricted speed limit, control means on the car governed by said trackway impulse devices and acting to control said apparatus to its speed limiting condition only after the reception in succession of two impulses from the trackway without an intervening restoring impulse, and trackway means for imparting an impulse for restoring said control means and apparatus to normal at the exit end of each block dependent upon traffic conditions in the next block in advance.

24. A system of train control for railroads having tracks divided into control zones in the same manner as in block signal systems, the combination with brake control apparatus on a vehicle controllable to establish a certain restricted speed limit that the vehicle cannot exceed without an automatic application of its brakes, a track device at an intermediate point in each control zone, an impulse receiving device on the vehicle co-operating with said track device and producing on the vehicle a control influence, control means acting if changed from normal to permit said apparatus to be controlled to its said speed limiting conditions by such control influence from said intermediate track device, said control means upon restoration thereof to normal resetting the changed parts of said apparatus and thereby removing said restricted speed limit, and means partly on the track and partly including said impulse receiving device for changing said control means from normal near the entrance to each control zone actuated by the presence of a train in the next control zone and for restoring said control means to normal at the exit end of each control zone provided the next control zone in advance is not then occupied.

25. A system for regulating the speed of railway vehicles on tracks divided into controlled zones as in block signal systems comprising, in combination with a brake-setting appliance on a vehicle adapted whenever de-energized to effect a brake application, a track device near the entrance to each control zone assuming an active controlling condition by reason of the presence of a train in the next control zone, another track device at an intermediate point in each control zone for communicating to the vehicle an influence of the same character as the first track device, apparatus on the vehicle for determining the operation of the brake-setting appliance comprising a centrifugal speed responsive device operatively connected to the wheels of the vehicle, said apparatus if in a certain condition establishing a predetermined restricted speed limit that the vehicle cannot exceed without operation of the brake-setting appliance and which continues in effect so long as said apparatus is in such condition, control means on the vehicle for said apparatus changed from normal upon passage over an active track device at the entrance to a control zone, said control means being further influenced by the track device at the intermediate point in the same control zone only if the control means is then in its changed condition, said control means if thus further influenced placing said apparatus in its said certain condition in which the restricted speed limit is established, and trackway means effective near the exit end of a control zone providing the next control zone in advance is not then occupied for causing restoration to normal of the changed parts of said apparatus.

26. In a speed control system for railroads divided into control zones as in block signal systems, the combination with car equipment comprising, a circuit controller, and speed governed brake control means rendered effective only after successive operations of said circuit controller to prescribe a continuing restricted speed limit that the car cannot exceed without an automatic brake application; of trackway means for causing such successive operation of said circuit controller at successive points in each control zone actuated by the presence of a train in the next control zone, and means for causing restoration of said brake control means to normal at the exit end of each control zone provided the control zone next in advance is not then occupied.

In testimony whereof I affix my signature.

CARL A. RICHMOND.